United States Patent
Jiao

(10) Patent No.: US 12,247,123 B2
(45) Date of Patent: Mar. 11, 2025

(54) POLYMERIC COMPOSITIONS WITH HIGH DIELECTRIC CONSTANT AND LOW DIELECTRIC LOSS

(71) Applicant: Celanese Polymers Holding, Inc, Wilmington, DE (US)

(72) Inventor: Yunfeng Jiao, Shanghai (CN)

(73) Assignee: Celanese Polymers Holding, Inc., Wilmington, DE (US)

( * ) Notice: Subject to any disclaimer, the term of this patent is extended or adjusted under 35 U.S.C. 154(b) by 776 days.

(21) Appl. No.: 17/414,890

(22) PCT Filed: Oct. 22, 2019

(86) PCT No.: PCT/US2019/057312
§ 371 (c)(1),
(2) Date: Jun. 16, 2021

(87) PCT Pub. No.: WO2020/131212
PCT Pub. Date: Jun. 25, 2020

(65) Prior Publication Data
US 2022/0056267 A1  Feb. 24, 2022

(30) Foreign Application Priority Data
Dec. 17, 2018  (CN) .......................... 201811541150.8

(51) Int. Cl.
*C08L 77/06* (2006.01)
*C08K 3/04* (2006.01)
*C08K 3/36* (2006.01)

(52) U.S. Cl.
CPC .............. *C08L 77/06* (2013.01); *C08K 3/042* (2017.05); *C08K 3/36* (2013.01); *C08K 2201/003* (2013.01); *C08K 2201/005* (2013.01); *C08L 2203/20* (2013.01)

(58) Field of Classification Search
CPC ..... C08L 77/06; C08L 2203/20; C08K 3/042; C08K 3/36; C08K 2201/003; C08K 2201/005
See application file for complete search history.

(56) References Cited

U.S. PATENT DOCUMENTS 9,617,456 B2    4/2017  Shim et al.

FOREIGN PATENT DOCUMENTS

| CN | 103937240 A | 7/2014 | | |
|---|---|---|---|---|
| CN | 106784717 A | 5/2017 | | |
| JP | 2005053752 A | * | 3/2005 | |
| KR | 2015064902 A | * | 6/2015 | ............. B32B 9/007 |
| WO | WO-2015031570 A1 | * | 3/2015 | ............. C01B 31/04 |

OTHER PUBLICATIONS

Abstract of Article—Noma et al., "Amorphous silica-coated graphite particles for thermally conductive and electrically insulating resins," *Carbon*, vol. 78, Nov. 2014, pp. 204-211.
Abstract of Article—Choi et al., "Synthesis of silica-coated graphite by enolization of polyvinylpyrrolidone and its thermal and electrical conductivity in polymer composites," *Carbon*, vol. 60, Aug. 2013, pp. 254-265.
International Search Report for PCT/US2019/057312 dated Feb. 11, 2020, 3 pages.

* cited by examiner

*Primary Examiner* — Ling Siu Choi
*Assistant Examiner* — Andrea Wu
(74) *Attorney, Agent, or Firm* — Dority & Manning, P.A.

(57) ABSTRACT

Disclosed herein are polymeric compositions with low dielectric loss while maintaining high dielectric constant. The composition includes: a) at least one thermoplastic polymer; and b) graphite flakes that are coated with silica coating particles, wherein, the coated graphite flakes have a weight ratio of C:Si ranging from about 10:1-4:1, and the silica coating particles have an average diameter of about 80-400 nm.

15 Claims, No Drawings

POLYMERIC COMPOSITIONS WITH HIGH DIELECTRIC CONSTANT AND LOW DIELECTRIC LOSS

CROSS-REFERENCES TO RELATED APPLICATIONS

This application claims priority under 35 U.S.C. §§ 365 and 371 to International Application No. PCT/US2019/057312, filed on Oct. 22, 2019, which in turn claims priority to Chinese Patent Appln. No. 201811541150.8, filed on Dec. 17, 2018, each of which is incorporated herein by reference in its entirety.

FIELD OF DISCLOSURE

This invention relates to polymeric compositions with high dielectric constant and low dielectric loss.

BACKGROUND

Polymer composites with high dielectric constant are very much desired in the electronic industry, Such polymeric composites can be used in a variety of electronic systems and devices, such as, capacitors, actuators, power cable terminations, miniatured antenna materials, etc. One conventional approach to achieve high dielectric constant in polymeric materials is to incorporate electrically conductive fillers, such as, carbon- or metal-based fillers. However, it is found that although higher content level of electrically conductive fillers in polymeric materials can improve the dielectric constant thereof, it also causes an increase on the dielectric loss. Thus, there is still a need to develop electrically conductive fillers for polymeric materials, such that the dielectric constant of the polymeric material is increased, while its dielectric loss remains low.

SUMMARY

Provided herein are polymeric compositions comprising: a) at least one thermoplastic polymer; and b) about 2-30 wt % graphite flakes that are coated with silica coating particles, with the total weight of the composition totaling to 100 wt %, wherein, the coated graphite flakes have a weight ratio of C:Si ranging from about 10:1-4:1, and the silica particles have an average diameter of about 80-400 nm.

In one embodiment of the polymeric composition, the at least one thermoplastic polymer is selected from the group consisting of polyamides, polyesters, polysulfones, polymethylmethacrylate, polyvinylchloride, polyketones, polyethers, polyphenylene sulphide, polyphenylene oxide, polyoxymethylene, polycarbonate, polylactic, polystyrene, polyolefins, and combinations of two or more thereof, or the at least one thermoplastic polymer is selected from polyamides, or the at least one thermoplastic polymer is polyimide 6,6.

In a further embodiment of the polymeric composition, the at least one thermoplastic polymer is present in the composition at a level of about 30-96 wt %, or about 40-90 wt %, or about 50-85 wt %, based on the total weight of the composition.

In a yet further embodiment of the polymeric composition, the coated graphite flakes are present in the composition at a level of about 3-30 wt %, or about 4-25 wt %, based on the total weight of the composition.

In a yet further embodiment of the polymeric composition, the silica coating particles have an average diameter of about 85-350 nm or an average diameter of about 90-300 nm.

In a yet further embodiment of the polymeric composition, the coated graphite flakes have a weight ratio of C:Si ranging from about 9.5:1-4:1 or from about 9:1-4.5:1.

Further provided herein are articles formed of the polymeric composition disclosed above.

In one embodiment, the article is part of an electronic device.

DETAILED DESCRIPTION

Disclosed herein are polymeric compositions with high dielectric constant and low dielectric loss. The polymeric composition comprises: a) at least one thermoplastic polymer and b) about 2-30 wt % of graphite flake that are coated with silica particles, wherein, the coated graphite flake has a weight ratio of C:Si ranging from about 10:1-4:1 and the silica coating particles have an average diameter of about 80-400 nm.

The term "thermoplastic polymer" is used herein referring to polymers that turn to a liquid when heated and freeze to a rigid state when cooled sufficiently. In accordance with the present disclosure, suitable thermoplastic polymers include, without limitation, polyamides, polyesters, polysulfones, polymethylmethacrylate, polyvinylchloride, polyketones, polyethers, polyphenylene sulphide, polyphenylene oxide, polyoxymethylene, polycarbonate, polylactic and its copolymers, polystyrene and its copolymers (e.g., ABS, SBS, SAN, etc.), polyolefins (e.g., polyethylene, polypropylene, copolymers of polyethylene and/or polypropylene), etc.

In one embodiment, the thermoplastic polymer used herein is selected from polyamides. Suitable polyamides include both aliphatic polyamides and aromatic polyamides.

Polyamides are (a) condensation products of one or more dicarboxylic acids and one or more diamines, or (b) condensation products of one or more aminocarboxylic acids, or (c) ring opening polymerization products of one or more cyclic lactams. The aromatic polyamides used herein may be homopolymers, copolymers, terpolymers or higher polymers containing at least one aromatic monomer component. For example, an aromatic polyamide may be obtained by using an aliphatic dicarboxylic acid and an aromatic diamine, or an aromatic dicarboxylic acid and an aliphatic diamine as starting material and subjecting them to polycondensation.

Suitable diamines used herein may be selected from aliphatic diamines, alicyclic diamines, and aromatic diamines. Exemplary diamines useful herein include, without limitation, tetramethylenediamine; hexamethylenediamine; 2-methylpentamethylenediamine; nonamethylenediamine; undecamethylenediamine, dodecamethylenediamine; 2,2,4-trimethylhexamethylenediamine; 2,4,4 trimethylhexamethylenediamine; 5-methylnonamethylene-diamine; 1,3-bis(aminomethyl)cyclohexane; 1,4-bis(aminomethyl)cyclohexane; 1-amino-3 aminomethyl-3,5,5-trimethylcyclohexane; bis(4-aminocyclohexyl)methane; bis(3-methyl-4-aminocyclohexyl)methane; 2,2-bis(4-aminocyclohexyl)propane; bis(aminopropyl)piperazine; aminoethylpiperazine; bis(p-aminocyclohexyl)methane; 2-methyloctamethylenediamine; trimethylhexamethylenediamine; 1,8-diaminooctane; 1,9 dieminononane; 1,10-diaminodecane; 1,12-diaminododecane; m-xylylenediamine; p-xylylenediamine; and the like and derivatives thereof.

Suitable dicarboxylic acids used herein may be selected from aliphatic dicarboxylic acids, alicyclic dicarboxylic acids, and aromatic dicarboxylic acids. Exemplary dicarboxylic acids useful herein include, without limitation, adipic acid; sebacic acid; azelaic acid; dodecanedoic acid; terephthalic acid; isophthalic acid; phthalic acid; glutaric acid; pimelic acid; suberic acid; 1,4-cyclohexanedicarboxylic acid; naphthalenedicarboxylic acid; and the like and derivatives thereof.

Exemplary aliphatic polyamides used herein include, without limitation, polyamide 6; polyamide 6,6; polyamide 4,6; polyamide 6,10; polyamide 6,12; polyamide 11; polyamide 12; polyamide 9,10; polyamide 9,12; polyamide 9,13; polyamide 9,14; polyamide 9,15; polyamide 6,16; polyamide 9,36; polyamide 10,10; polyamide 10,12; polyamide 10,13; polyamide 10,14; polyamide 12,10; polyamide 12,12; polyamide 12,13; polyamide 12,14; polyamide 6,14; polyamide 6,13; polyamide 6,15; polyamide 6,16; and the like.

Exemplary aromatic polyamides used herein include, without limitation, poly(m-xylylene adipamide) (polyimide MXD,6); poly(dodecamethylene terephthalamide) (polyamide 12,T); poly(undecamethylene terephthalamide) (polyamide 11,T); poly(decamethylene terephthalamide) (polyamide 10,T); poly(nonamethylene terephthalamide) (polyamide 9,T); poly(hexamethylene terephthalamide) (polyamide 6,T); hexamethylene adipamide/hexamethylene terephthalamide copolyamide (polyamide 6,T/6,6, i.e., polyamide 6,T/6,6 having at least about 50 mol % of its repeating units derived from 6,T); hexamethylene terephthalamide/hexamethylene adipamide copolyamide (polyimide 6,6/6,T, i.e., polyamide 6,6/6,T having at least about 50 mol % of its repeating units derived from 6,6); poly(hexamethylene terephthalamide/hexamethylene isophthalamide) (polyamide 6,T/6,1, i.e., polyamide 6,T/6,I having at least about 50 mol % of its repeating units derived from 6,T); hexamethylene terephthalamide/2-methylpentamethylene terephthalamide copolyamide (polyamide 6,T/D,T); hexamethylene adipamide/hexamethylene terephthalamide/hexamethylene isophthalamide copolyamide (polyamide 6,6/6,T/6,1); poly(caprolactam-hexamethylene terephthalamide) (polyamide 6/6,T); poly(hexamethylene isophthalamide/hexamethylene terephthalamide) (polyamide 6,1/6,T, i.e., polyamide 6,1/6,T having at least about 50 mol % of its repeating units derived from 6,1); poly(hexamethylene isophthalamide) (polyamide 6,1); poly(metaxylylene isophthalamide/hexamethylene isophthalamide) (polyamide MXD,I/6,I); poly(metaxylylene isophthalamide/metaxylylene terephthalamide/hexamethylene isophthalamide) (polyamide MXD,I/MXD,T/6,I/6,T); poly(metaxylylene isophthalamide/dodecamethylene isophthalamide) (polyamide MXD,I/12,I); poly(metaxylylene isophthalamide) (polyamide MXD,I); poly(dimethyldiaminodicyclohexylmethane isophthalamide/dodecanamide) (polyamide MACM,I/12); poly(dimethyldiaminodicyclohexylmethane isophthalamide/dimethyldiaminodicyclohexylmethane terephthalamide/dodecanamide) (polyamide MACM, I/MACM,T/12); poly(hexamethylene isophthalamide/dimethyldiaminodicyclohexylmethane isophthalamide/dodecanamide) (polyamide 6,I/MACM,I/12); poly(hexamethylene isophthalamide/hexamethylene terephthalamide/dimethyldiaminodicyclohexylmethane isophthalamide/dimethyldiaminodicyclohexylmethane terephthalamide) (polyamide 6,I/6,T/MACM, I/MACM,T); poly(hexamethylene isophthalamide/hexamethylene terephthalamide/dimethyldiaminodicyclohexylmethane isophthalamid/dimethyldiaminodicyclohexylmethane terephthalamide/dodecanamide) (polyamide 6,I/6,T/MACM,I/MACM,T/12); poly(dimethyldiaminodicyclohexylmethane isophthalamide/dimethyldiaminodicyclohexylmethane dodecanamide) (polyamide MACM,U/MACM,12); and the like.

In a further embodiment, the thermoplastic polymer used herein is polyamide 6,6.

Based on the total weight of the polymeric composition disclosed herein, the at least one thermoplastic polymer may be present at a level of about 30-96 wt %, about 40-90 wt %, or about 50-85 wt %.

The graphite flake used herein are graphite particles that are not in the form of fibers. Graphite flake also includes graphite powder and graphite particles. The graphite can be naturally occurring graphite or synthetic graphite. Non-fibrous graphite or graphite flake has an aspect ratio (length to width ratio) of less than 2. Such flakes are typically round, oval, flat, or irregular in shape.

In accordance with the present disclosure, the graphite flake used herein are completely or partially coated with silica particles, which is referred to as coated graphite flake. The silica coating particles have an average diameter of about 80-400 nm, or about 85-350 nm, or about 90-300 nm. The average diameter may be determined by measuring and averaging the diameters of 100 or more randomly picked coated graphite flakes using, for example, scanning electron microscope (SEM). And, within the coated graphite flake, the weight ratio of C:Si ranges from about 10:1-4:1, or from about 9.5:14:1, or from about 9:14.5:1.

The coated graphite flake used herein may be prepared by a sol-gel process, such as the process disclosed in PCT Patent Application Publication No. WO201531570 (which is incorporated herein by reference). The sol-gel process includes mixing in a solvent graphite flakes, a silica precursor, a hydrolysis, and a surfactant (optional and may be cationic surfactant or amphoteric surfactant) to result in a mixture solution. Such mixing results in chemically reacting the silica precursor to form a layer of silica particles on the surface of the graphite flakes. And the coated graphite flakes may be removed by filtration from the mixture solution.

The solvents used in the sol-gel process are aqueous solution, in which, the graphite flakes, silica precursors, hydrolysis, and optional surfactants are uniformly dispersed and reacted. Preferably, the solvents used herein are solvent mixtures of water and any one or more of the following: isopropyl alcohol (IPA), methanol, ethanol, methyl ethyl ketone (MEK), methyl isobutyl ketone (MIRK), propylene glycol monomethyl ether (PGME), propylene glycol monomethyl ether acetate (PGMEA), monoethanolamine (MEA), dipropylene glyol diacrylate (DPGDA), and mixtures of two or more thereof. In one embodiment, the solvent is an aqueous solution of water and one or more of the following: isopropyl alcohol (IPA), methanol, ethanol, methyl ethyl ketone (MEK), methyl isobutyl ketone (MIBK), propylene glycol monomethyl ether (PGME), propylene glycol monomethyl ether acetate (PGMEA), monoethanolamine (MEA), dipropylene glyol diacrylate (DPGDA). In one embodiment, the solvent may be a mixture of water and one or more of the following: isopropyl alcohol (IPA), methanol, and ethanol. When the solvent is an aqueous solution of water and IPA, methanol, or ethanol, the amount of solvent may range from about 300 to 5000 weight parts per 100 weight parts of the graphite flakes and the mass ratio between water and IPA, methanol, and/or ethanol ranges from about 1:3 to about 1:10.

The silica precursor used in the sol-gel process is the source of the silica that coats the graphite flakes.

The silica precursor may be silicon alkoxide represented by formula (I):

$(R^1)_n Si(OR^2)_{4-n}$, where $R^1$ represents hydrocarbons with 1 to 8 identical or different, substituted or unsubstituted carbon atoms, n represents 0, 1, 2, or 3, and $R^2$ represents hydrocarbons with 1 to 8 carbon atoms. The silicon alkoxide is reacted with water and the hydrolysis catalyst to create silica, which is the entity that coats the carbon particles.

The silicon alkoxide may be tetraalkoxysilane. Or, the tetraalkoxysilane may be tetraethoxysilane, tetramethoxysilane, tetrapropoxysilane, tetrabutoxysilane, tetraamyloxysilane, tetraoctyloxysilane, tetranonyloxysilane, dimethoxy diethoxy silane, dimethoxy diisopropoxy silane, diethoxy diisopropoxy silane, diethoxy dibutoxy silane, diethoxy ditrityloxy silane, or mixtures of two or more thereof.

When the silicon alkoxide is tetraethoxysilane (TEOS, $Si(OC_2H_5)_4$)), the hydrolysis reaction is:

$Si(OC_2H_5)_4 + 2\ H_2O \rightarrow SiO_2 + 4\ C_2H_5OH$

Hydrolysis catalysts promote the hydrolysis reaction of silica precursors as acidic hydrolysis catalysts or basic hydrolysis catalysts. The methods described herein may use acidic hydrolysis catalysts or basic hydrolysis catalysts. Acidic hydrolysis catalysts are proton ($H^+$) donors that promote the hydrolysis reaction through protonation of oxygen atoms, whereas basic hydrolysis catalysts are proton ($H^+$) acceptors that promote the reaction by enabling nucleophilic addition through proton transfer from carbon atoms in hydrolysis.

Hydrochloric acid may be preferable as an acidic hydrolysis and ammonium hydroxide may be preferable as a basic hydrolysis catalyst.

Surfactants are optionally included in the sol-gel process. The surfactants used herein may be cationic surfactants with hydrophilic groups that dissociate in aqueous solution into cations or amphoteric surfactants that dissociate in aqueous solution into both anions and cations. The surfactants are used in the process as binders of the graphite flakes and the silica.

Exemplary amphoteric surfactants used herein include, without limitation, polyvinylpyrrolidone, lauryl dimethyl amino acetic acid betaine, stearyl dimethyl amino acetic acid betaine, lauryl dimethyl amine oxide, lauric acid amido propyl betaine, lauryl hydroxy sulfobetaine, 2-alkyl-N-carboxymethyl-N-hydroxyethylimidazolinium betaine, N-lauroyl-N'-carboxymethyl-N'-hydroxyethyl ethylene diamine sodium, N-coconut oil fatty acid acyl-N'-carboxyethyl-N'-hydroxyethyl ethylene diamine sodium, oleyl-N-carboxyethyl-N-hydroxyethyl ethylene diamine sodium, cocamidopropyl betaine, lauramido propyl betaine, myristamidopropyl betaine, palm kernelamidopropyl betaine, lauramidopropyl hydroxysultaine, lauramidopropyl amine oxide, hydroxyalkyl ($C_{12\text{-}14}$) hydroxyethyl sarcosine, etc.

Suitable cationic surfactants may be selected from quaternary ammonium salts, alkylamine salts, pyridinium salts, etc. Quaternary ammonium salts and alkylamine salts are represented by formula (II);

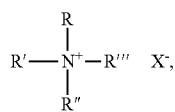

(II)

wherein

R represents identical or different alkyls, and X represents the halogens fluorine (F), chlorine (Cl), and bromine (Br).

Examples of quaternary ammonium salts used herein include, without limitation, hexadecyl trimethyl ammonium chloride, hexadecyl trimethyl ammonium bromide, octyl trimethyl ammonium chloride, octyl trimethyl ammonium bromide, decyl trimethyl ammonium chloride, decyl trimethyl ammonium bromide, dodecyl trimethyl ammonium chloride, dodecyl trimethyl ammonium bromide, octadecyl trimethyl ammonium chloride, octadecyl trimethyl ammonium bromide, stearyl trimethyl ammonium chloride, stearyl trimethyl ammonium bromide, cetyl trimethyl ammonium chloride, cetyl trimethyl ammonium bromide, distearyl dimethyl ammonium chloride, distearyl dimethyl ammonium bromide, benzalkonium chloride, benzethonium chloride, cetyl pyridinium chloride, decalinium chloride, and iodofluoroalkyl trimethyl ammonium, etc.

Examples of alkylamines used herein include, without limitation, rioctylamine hydrochloride, trioctylamine hydrobromide, tridecylamine hydrochloride, tridecylamine hydrobromide, tridodecylamine hydrochloride, tridodecylamine hydrobromide, trihexadecylamine hydrochloride, trihexadecylamine hydrobromide, trioctadecylamine hydrochloride, trioctadecylamine hydrobromide, etc.

Pyridinium salts have a pyridine ring and are represented by general formula (III):

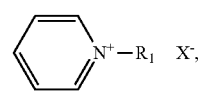

(III)

wherein

R represents an alkyl, and X represents the halogens fluorine (F), chlorine (Cl), and bromine (Br).

Examples of pyridinium salts used herein include, without limitation, pyridinium chloride, cetylpyridinium chloride, cetylpyridinium bromide, myristyl pyridinium chloride, myristyl pyridinium bromide, dodecylpyridinium chloride, dodecylpyridinium bromide, ethylpyridinium chloride, ethylpyridinium bromide, hexadecylpyridinium chloride, hexadecylpyridinium bromide, butyl pyridinium chloride, butyl pyridinium bromide, methyl hexyl pyridinium chloride, methyl hexyl pyridinium bromide, methyl octyl pyridinium chloride, methyl octyl pyridinium bromide, dimethyl butyl pyridinium chloride, and dimethyl butyl pyridinium bromide.

To obtain the coated graphite used herein, graphite, hydrolysis, and optional surfactants are dispersed in solvents evenly by ultrasound at room temperature, which is followed by adding silica precursor into the dispersion with the weight ratio between silica precursor to graphite being about 0.8:1-4:1. The coating reaction is performed at room temperature for about 4-20 hours and the resultant coated graphite can be obtained by filtration and drying.

Based on the total weight of the polymeric composition disclosed herein, the coated graphite flakes may be present at a level of about 3-30 wt % or about 4-25 wt %.

The electrically conductive polyester composition disclosed herein may further comprise other additives, such as colorants, antioxidants, UV stabilizers, UV absorbers, heat stabilizers, lubricants, viscosity modifiers, nucleating agents, plasticizers, mold release agents, scratch and mar modifiers, impact modifiers, emulsifiers, optical brighteners, antistatic agents, acid adsorbents, smell adsorbents, anti-hydrolysis agents, anti-bacterial agents, density modifiers, reinforcing fillers, thermal conductive fillers, electrical conductive fillers, coupling agents, end-capping reagents and combinations of two or more thereof. Based on the total weight of the electrically conductive polyester composition disclosed herein, such additional additive(s) may be present at a level of about 0.005-30 wt % or about 0.01-25 wt %, or about 0.02-20 wt %.

As demonstrated herein, by incorporating graphite flakes coated with silica particles, polymeric compositions with high dielectric constant and low dielectric loss ("dielectric constant/dielectric loss" ratio above 300) can be obtained.

Further disclosed herein are articles formed of the polymeric compositions disclosed herein. Such polymeric compositions can be used in many areas including communication devices, electronics and electric power systems. Exemplary articles formed of the polymeric composition, include, without limitation, capacitors, actuators, power cable terminations, and miniatured antenna.

EXAMPLES

Materials
- PA66—Polyamide 6,6 obtained from E.I. du Pont de Nemours and Company (U.S.A.) (hereafter "DuPont") under the trade name Zytel® 101 NC010;
- Irganox 1010—Antioxidant, pentaerythritol tetrakis(3-(3,5-di-tert-butyl-4-hydroxyphenyl)propionate) purchased from BASF (Germany);
- Crodamide 212—Lubricant, stearyl erucamide obtained from Croda (UK);
- GF—Graphite flake, obtained from Ningbo Sinyuan Graphite Co., Ltd. (China) (D90=50 μm);
- C-GF-1—Coated graphite flake (average diameter of silica coating particles: 243±38 nm and weight ratio of C:Si: 15:1) prepared as follows: adding 2 g of GF in a solution comprised of 80 ml of ethanol, 20 ml of deionized water, and 3 ml of ammonium hydroxide; mixing the dispersion with ultrasound at room temperature for 20 min; adding 4 ml of tetraethoxysilane into the dispersion dropwise over 10 minutes; stirring the dispersion at room temperature for about 2 hours; extracting the coated graphite flake by filtration and drying at 90° C.;
- C-GF-2—Coated graphite flake (average diameter of silica coating particles: 236±33 nm, weight ratio of C:Si: 8:1) prepared as follows: adding 2 g of GE in a solution comprised of 80 ml of ethanol, 20 ml of deionized water, and 3 ml of ammonium hydroxide; mixing the dispersion with ultrasound at room temperature for 20 min; adding 4 ml of tetraethoxysilane into the dispersion dropwise over 10 minutes; stirring the dispersion at room temperature for about 6 hours; extracting the coated graphite flake by filtration and drying at 90° C.;
- C-GF-3—Coated graphite flake (average diameter of silica coating particles: 249±34 nm, weight ratio of C:Si: 5:1) prepared as follows; adding 2 g of GF in a solution comprised of 80 ml of ethanol, 20 ml of deionized water, and 3 ml of ammonium hydroxide; mixing the dispersion with ultrasound at room temperature for 20 min; adding 4 ml of tetraethoxysilane into the dispersion dropwise over 10 minutes; stirring the dispersion at room temperature for about 10 hours; extracting the coated graphite flake by filtration and drying at 90° C.;
- C-GF-4—Coated graphite flake (average diameter of silica coating particles: 258±31 nm, weight ratio of C:Si: 2.8:1) prepared as follows: adding 2 g of GF in a solution comprised of 80 ml of ethanol, 20 ml of deionized water, and 3 ml of ammonium hydroxide; mixing the dispersion with ultrasound at room temperature for 20 min; adding 4 ml of tetraethoxysilane into the dispersion dropwise over 10 minutes; stirring the dispersion at room temperature for about 24 hours; extracting the coated graphite flake by filtration and drying at 90° C.;
- C-GF-5—Coated graphite flake (average diameter of silica coating particles: 104±15 nm, weight ratio of C:Si: 7:1) prepared as follows: adding 2 g of GF in a solution comprised of 80 ml of ethanol, 20 ml of deionized water, and 3 ml of ammonium hydroxide; mixing the dispersion with ultrasound at room temperature for 20 min; adding 2 ml of tetraethoxysilane into the dispersion dropwise over 10 minutes; stirring the dispersion at ambient temperature for about 12 hours; extracting the coated graphite flake by filtration and drying at 90° C.;
- C-GF-6—Coated graphite flake (average diameter of silica coating particles: 15±4 nm, weight ratio of C:Si: 10:1) prepared as follows: adding 2 g of GE and 0.3 g of cetyltrimethyl ammonium bromide (as cationic surfactant) in a solution comprised of 80 ml of ethanol, 20 ml of deionized water, and 3 ml of ammonium hydroxide; mixing the dispersion with ultrasound at room temperature for 20 min; adding 0.5 ml of tetraethoxysilane into the dispersion; stirring the dispersion at room temperature for about 6 hours; extracting the coated graphite flake by filtration and drying at 90° C.;
- C-GF-7—Coated graphite flake (average diameter of silica coating particles: 102±16 nm, weight ratio of C:Si: 8:1) prepared as follows: adding 2 g of GF and 0.3 g of cetyltrimethyl ammonium bromide (as cationic surfactant) in a solution comprised of 80 ml of ethanol, 20 ml of deionized water, and 3 ml of ammonium hydroxide; mixing the dispersion with ultrasound at room temperature for 20 min; adding 2 ml of tetraethoxysilane into the dispersion dropwise over 10 minutes; stirring the dispersion at room temperature for about 10 hours; extracting the coated graphite flake by filtration and drying at 90° C.;
- C-GF-8—Coated graphite flake (average diameter of silica coating particles: 16±5 nm, weight ratio of C:Si: 8:1) prepared as follows: adding 2 g of GF and 0.3 g of cetyltrimethyl ammonium bromide (as cationic surfactant) in a solution comprised of 80 ml of ethanol; 20 ml of deionized water, and 3 ml of ammonium hydroxide; mixing the dispersion with ultrasound at room temperature for 20 min; adding 0.5 ml of tetraethoxysilane into the dispersion; stirring the dispersion at room temperature for about 10 hours; extracting the coated graphite flake by filtration and drying at 90° C.;
- $SiO_2$—Silica nanoparticles obtained from Lianyungang Oawa New Material Technology., Ltd, (China) (D90=200 nm).

The average diameter of the silica coating particles was determined by randomly selecting 100 silica particles and averaging the diameters thereof by a scanning electron microscope (SEM) (Sigma 500, manufactured by ZEISS (Germany)). The weight ratio of C:Si was measured by an Energy Dispersive Spectrometer (X-MAX80, Oxford Instruments (UK)) at 20 keV. First, randomly selecting 10 different areas over the coated graphite flakes, wherein no more than two selected areas were from one coated flake. And then, the contents of C and Si in each area were measured and the averaged weight ratio of C:Si was calculated.

In each of comparative examples CE1-CE8 and examples E1-E6, a polymer composition (all components listed in Table 1) was prepared using Process 11 Parallel Twin-Screw Extruder (manufactured by Thermo Fisher Scientific (USA)) with the barrel temperature set at about 280° C. and the screw speed at about 150 rpm. Test samples were prepared by hot pressing the pellets into 60×60×2 mm cube pieces using a hot press (model 4386, manufactured by Carver, Inc. (USA)) with the melt temperature set at 290° C. The 60×60×2 mm cube pieces were then used to determine the dielectric constant and dielectric loss of the compositions using N5221A PNA Microwave Network Analyzer (manufactured by Keysight Technologies (USA)).

As shown in CE1-CE4, the addition of electrically conductive fillers such as graphite improved the dielectric constant of polymeric material. However, it also increased the dielectric loss thereof and resulted to a "dielectric constant/dielectric loss" ratio below 200. However, by replacing graphite with certain silica coated graphite flakes (E1-E6), polymeric material with high dielectric constant and low dielectric loss ("dielectric constant/dielectric loss" ratio above 300) was obtained. In such silica coated graphite flakes, the weight ratio between C:Si ranged from about 10:1-4:1, and the silica coating particles had an average diameter of about 80-400 nm.

TABLE 1

|  | CE1 | CE2 | CE3 | CE4 | CE5 | CE6 | CE7 | CE8 |
|---|---|---|---|---|---|---|---|---|
| Composition | | | | | | | | |
| PA66 | 94.4 | 92.9 | 84.4 | 89.4 | 94.4 | 94.4 | 94.4 | 94.4 |
| IRGANOX 1010 | 0.3 | 0.3 | 0.3 | 0.3 | 0.3 | 0.3 | 0.3 | 0.3 |
| Crodarnide 212 | 0.3 | 0.3 | 0.3 | 0.3 | 0.3 | 0.3 | 0.3 | 0.3 |
| Graphite | 5 | 5 | 5 | 10 | — | — | — | — |
| C-GF-1 | — | — | — | — | 5 | — | — | — |
| C-GF-2 | — | — | — | — | — | — | — | — |
| C-GF-3 | — | — | — | — | — | — | — | — |
| C-GF-4 | — | — | — | — | — | 5 | — | — |
| C-GF-5 | — | — | — | — | — | — | — | — |
| C-GF-6 | — | — | — | — | — | — | 5 | — |
| C-GF-7 | — | — | — | — | — | — | — | — |
| C-GF-8 | — | — | — | — | — | — | — | 5 |
| $SiO_2$ | — | 1.5 | 10 | — | — | — | — | — |
| Properties | | | | | | | | |
| Dielectric constant (2.45 GHz) | 11.2 | 11.4 | 11.9 | 21.5 | 8.2 | 4.3 | 4.5 | 4.3 |
| Dielectric loss (2.45 GHz) | 0.0637 | 0.0640 | 0.0643 | 0.1104 | 0.0357 | 0.0156 | 0.0201 | 0.0192 |
| Dielectric constant/ Dielectric loss | 175 | 178 | 185 | 194 | 229 | 275 | 223 | 224 |

|  | E1 | E2 | E3 | E4 | E5 | E6 |
|---|---|---|---|---|---|---|
| Composition | | | | | | |
| PA66 | 94.4 | 89.4 | 79.4 | 94.4 | 94.4 | 94.4 |
| IRGANOX 1010 | 0.3 | 0.3 | 0.3 | 0.3 | 0.3 | 0.3 |
| Crodarnide 212 | 0.3 | 0.3 | 0.3 | 0.3 | 0.3 | 0.3 |
| Graphite | — | — | — | — | — | — |
| C-GF-1 | — | — | — | — | — | — |
| C-GF-2 | 5 | 10 | 20 | — | — | — |
| C-GF-3 | — | — | — | 5 | — | — |
| C-GF-4 | — | — | — | — | — | — |
| C-GF-5 | — | — | — | — | 5 | — |
| C-GF-6 | — | — | — | — | — | — |
| C-GF-7 | — | — | — | — | — | 5 |
| C-GF-8 | — | — | — | — | — | — |
| $SiO_2$ | — | — | — | — | — | — |
| Properties | | | | | | |
| Dielectric constant (2.45 GHz) | 7.4 | 13.9 | 23.8 | 5.7 | 6.8 | 6.5 |
| Dielectric loss (2.45 GHz) | 0.0162 | 0.0306 | 0.0573 | 0.0168 | 0.0181 | 0 0185 |
| Dielectric constant/ Dielectric loss | 456 | 454 | 415 | 339 | 376 | 351 |

What is claimed is:

1. A polymeric composition comprising: a) at least one thermoplastic polymer; and b) 2 to 30 wt % graphite flakes that are coated with silica coating particles, with the total weight of the composition totaling to 100 wt %, wherein, the coated graphite flakes have a weight ratio of C:Si ranging from 10:1 to 4:1, and the silica coating particles have an average diameter of 80 to 400 nm, wherein the at least one thermoplastic polymer comprises a polyamide.

2. The polymeric composition of claim 1, wherein the at least one thermoplastic polymer is present at a level of 30 to 96 wt %, based on the total weight of the polymeric composition.

3. The polymeric composition of claim 1, wherein the coated graphite flakes are present at a level of 3 to 30 wt %, based on the total weight of the polymeric composition.

4. The polymeric composition of claim 1, wherein the silica coating particles have an average diameter of 85 to 350 nm.

5. The polymeric composition of claim 1, wherein the coated graphite flakes have a weight ratio of C:Si ranging from 9.5:1 to 4:1.

6. An article formed of the polymeric composition of claim 1.

7. The article of claim 6, which is part of an electronic device.

8. The polymeric composition of claim 1, wherein the at least one thermoplastic polymer is a mixture of two or more polyamides.

9. The polymeric composition of claim 1, wherein the polyamide is polyamide 6,6.

10. The polymeric composition of claim 2, wherein the at least one thermoplastic polymer is present at a level of 40 to 90 wt %.

11. The polymeric composition of claim 10, wherein the at least one thermoplastic polymer is present at a level of 50 to 85 wt %.

12. The polymeric composition of claim 3, wherein the coated graphite flakes are present at a level of 4 to 25 wt %.

13. The polymeric composition of claim 4, wherein the silica coating particles have an average diameter of 90 to 300 nm.

14. The polymeric composition of claim 5, wherein the coated graphite flakes have a weight ratio of C:Si ranging from 9:1 to 4.5:1.

15. A polymeric composition comprising: a) at least one thermoplastic polymer; and b) 2 to 30 wt % graphite flakes that are coated with silica coating particles, with the total weight of the composition totaling to 100 wt %, wherein, the coated graphite flakes have a weight ratio of C:Si ranging from 10:1 to 4:1, and the silica particles have an average diameter of 102 to 400 nm.

* * * * *